Oct. 24, 1939.         G. B. KIDD         2,177,528
APPARATUS FOR TESTING LAYERS OF INSULATION
Filed Oct. 2, 1937

INVENTOR
GEORGE B. KIDD
BY
ATTORNEY

Patented Oct. 24, 1939

2,177,528

UNITED STATES PATENT OFFICE 2,177,528

APPARATUS FOR TESTING LAYERS OF INSULATION

George B. Kidd, Yonkers, N. Y., assignor to Anaconda Wire and Cable Company, New York, N. Y., a corporation of Delaware Application October 2, 1937, Serial No. 166,933

2 Claims. (Cl. 175—183)

This invention relates to the testing of insulating layers especially where the insulation possesses dielectric qualities and is applied in the form of a concentric sheath to electrical wire and cables.

In the manufacture of insulated electric conductors it is usually almost impossible in commercial practice to produce an insulating jacket which is entirely uniform in thickness. Furthermore, when variations exist in the thickness of the insulating layers, it is often impossible to detect the eccentricity except at the extreme ends of the conductor, where the cross section may be readily examined. If, as is generally required, the cable must be manufactured in long unbroken lengths, the position of the conductors within the insulation is only approximately known since cutting sections for purposes of examination would destroy the value of the piece. Frequently unbroken lengths of five thousand feet are required. When rubber coatings are extruded about conducting strands, the die and tubing machine are initially set to produce a concentric jacket and it is, of course, possible to measure the uniformity of the thickness of the jacket at the opposite end of the strand when the process of extrusion has been completed. This does not mean that the conductor has a uniform coating at all points throughout its length, and it is generally not practical to cut the strand at a number of points in order to verify the thickness of the jacket.

It is the chief object of this invention to supply a method and apparatus for measuring continuously the relative thickness of a layer of insulating material overlying a conductor. By the use of the process of this invention it is possible to determine the eccentricity of an insulated jacket during extrusion so that appropriate adjustments of the die and tubes may be made immediately to remedy eccentricity as soon as it occurs, thus saving frequent stripping and re-insulation of conductors.

The invention takes advantage of the variation of capacitance which occurs between the surface of the insulation and the conductor of an insulated strand when the jacket is not concentric with the conductor or when voids or conducting particles are included. As used in this description, the term "thickness" means the thickness of actual insulation placed upon the conductor. That is to say, if a void or conducting particle is included in the wall of insulation it will be revealed as a variation in thickness of the jacket. The apparatus and method of this invention may, therefore, be employed where the thickness (as ordinarily understood) of the insulating coating is not of primary importance but where it is essential that the presence of voids or defects be located, a situation which frequently occurs in the manufacture of rubber covered conductors which are designed to operate at high potentials, since it is of great importance that no voids exist adjacent to the conductor as this will result in ozone formation and rapid deterioration of the insulation by "ozone cutting". A further object of this invention is to provide a simple automatic apparatus for the detection of voids or particles of low dielectric quality which may be included in insulating layers. It will further be understood that the term "rubber" includes, for purposes of this explanation, any homogeneous, plastic compound which may be used for insulation.

The present invention will be described with reference to the accompanying drawing which represents the testing of a length of insulated wire and in which similar reference numerals denote similar parts.

Figure 1:
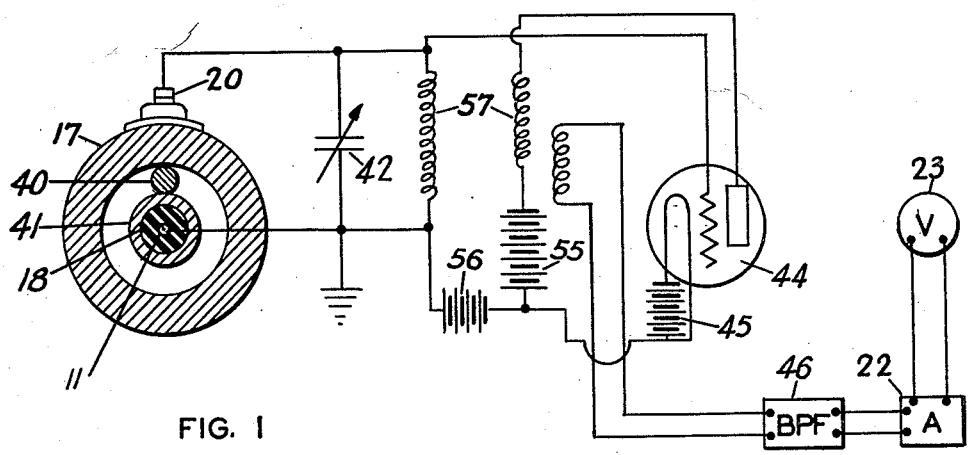
Figure 1 is a wiring diagram, together with a diagrammatic vertical section of mechanism capable of comparing all points of the surface of the conductor.

Referring to Figure 1, the uninsulated electric conductor 11 is drawn from a suitable reel or coil and passed through a suitable extrusion head where a layer of insulating compound, such as rubber, is applied. The mechanism for supplying the compound under pressure to the head is not shown in detail as it has no bearing on this invention, and many devices capable of performing this operation are well known in the art. The strand 11 is in electrical contact with the head, and since it is grounded, the conductor itself is also grounded furnishing one side of the testing circuit. If a rubber jacket is to be placed over a previously insulated conductor, provision must be made for grounding the strand to the supply reel.

A suitable electrode arrangement is indicated in Figure 1 where the electrode takes the form of a roller or shoe 40. The roller or shoe runs on a surface of an annular insulating insert 41 so that there is no mechanical contact between the roller and the surface of the insulation which, if of rubber, would be unvulcanized and pasty at this stage of manufacture. It is, of course, important that the wall of the protective annulus 41 be of uniform thickness so that its capacitance will be equal at all points on its circumference, but it is entirely possible to supply a set of concentric inserts of varying internal diameters to accommodate a wide range of sizes of insulated conductors.

The measuring circuit indicated in this figure comprises an electron oscillator with the electrode to conductor capacitance in the oscillating circuit in parallel with a second capacitor to obtain larger changes in tuning capacitance. The oscillator indicated is of the tuned grid type comprising the capacitance between the electrode 40 and the conductor 11, the variable capacitance 42 in parallel with it, the oscillation transformer 57 and an electron tube 44 together with a suitable power supply, indicated here as batteries 45, 55 and 56. In this arrangement the generated frequency is changed by variations in the thickness of insulation overlying the conductor 11 and the generated voltage is supplied by a frequency responsive detector shown here as a band pass filter 46, amplifier 22 and indicator 23. Variations in thickness of the insulating wall would, of course, be detected by fluctuations in the indicator 23 and it is possible to determine the radical position of the void or eccentricity when the position of the roller 40 is known.

Figure 2:
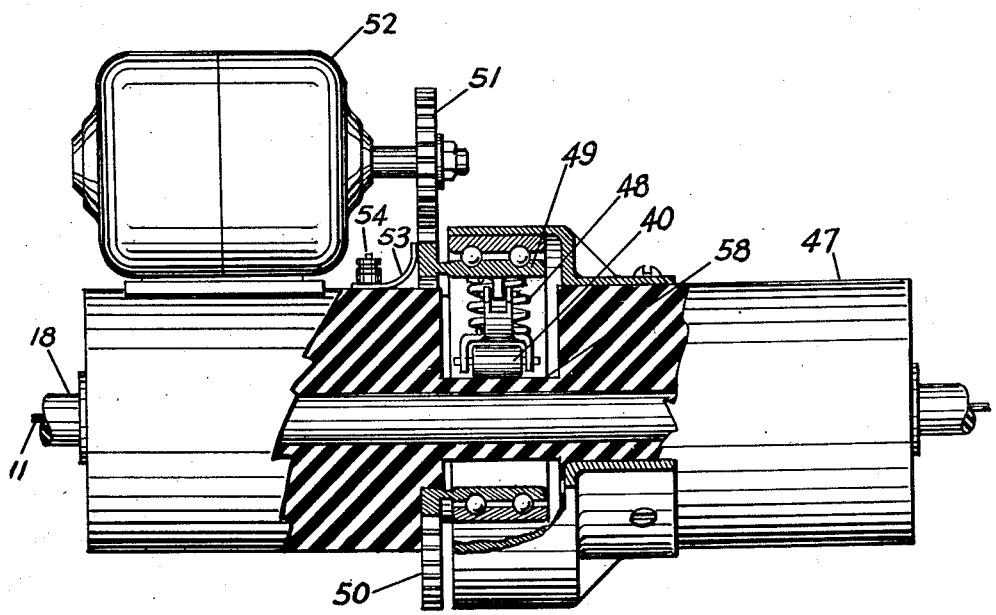
Figure 2 is a perspective view, with parts broken away, of a suitable revolving electrode assembly for use with the parts illustrated in Figure 1.

A suitable mechanism for the roller device of Figure 1 is illustrated in Figure 2 in which a cylinder 47 formed of insulating material such as Bakelite is used for the body of detecting unit. The cylinder 47 has an internal bore with a diameter which is substantially equal to the exterior of the insulated conductor 18. The electrode roller 40 is maintained in bearing contact with the sleeve portion 58 by the compression spring 48. The entire roller assembly is mounted on the inner raceway of the bearing 49 which is rotated by the electrically conducting ring gear 50 driven in turn by the pinion 51 from the motor 52 mounted on the electrode housing 17. Leads from the measuring circuit may then be taken from the conductor 11 and from the bearing 49 by means of an appropriate contact 53 and terminal 54.

This invention may be employed wherever it is necessary to detect variations in thickness of a material possessing dielectric qualities when placed over an electrical conductor. In practice it is frequently desirable to incorporate the die of the extrusion machine and the detecting mechanism within a single unit, but for clarity of explanation this has not been done in this description. While several embodiments of the invention have been described and illustrated it will be apparent to those skilled in the art that many changes, omissions, additions and substitutions may be made therein without departing from the scope of my invention as set forth in the accompanying claims.

What is claimed is:

1. Apparatus for the detection of variations in concentricity of insulated electric conductors which comprises means for grounding said conductor, means for rotating a contact about said conductor at a fixed distance from the surface of the insulation of said conductor and indicating means responsive to fluctuations in capacitance between said contact and said conductor.

2. Apparatus for the detection of eccentricity in the insulating coatings of electric conductors which comprises means for establishing a contact with said conductor, means for rotating a second contact about said conductor at a fixed distance from the surface of the insulation of said conductor and means for measuring the variations in capacitance between said contacts.

GEORGE B. KIDD.